3,816,404
PREPARATION OF CAPROLACTAM
Mahmoud S. Kablaoui, Wappingers Falls, Richard F. Love, Fishkill, and Roger G. Duranleau, Ardonia, N.Y., assignors to Texaco Inc., New York, N.Y.
No Drawing. Filed Dec. 8, 1971, Ser. No. 206,197
Int. Cl. C07d 41/06
U.S. Cl. 260—239.3 A          17 Claims

ABSTRACT OF THE DISCLOSURE

A method for preparing caprolactam by the steps of (1) nitro-oxidizing cyclohexene to 2-nitrocyclohexanone, (2) cleaving and esterifying 2-nitrocyclohexanone with an alcohol to form an alkyl 6-nitrohexanoate and (3) catalytically hydrogenating and cyclizing the nitroester to caprolactam.

BACKGROUND OF THE INVENTION

This invention relates to a novel method for preparing caprolactam from cyclohexene. In particular, this invention relates to a method for preparing caprolactam in the absence of the formation of large quantities of by-products.

Industrially, caprolactam is prepared by rearrangement of cyclohexanone oxime in oleum followed by neutralization of the excess sulfuric acid with ammonia to produce between two and six pounds of ammonium sulfate per pound of caprolactam. The various industrial processes differ in the preparation of the cyclohexanone oxime. A serious disadvantage common to all of the processes presently utilized is the formation of large quantities of the by-product ammonium sulfate which is not easily saleable.

Caprolactam is a valuable material widely employed in the production of fibers and resins. As such, a process capable of providing caprolactam which simultaneously does not produce ammonium sulfate as a by-product would be highly desirable.

It is therefore an object of this invention to provide a method for the preparation of caprolactam.

Another object of this invention is to provide a method for the preparation of caprolactam from cyclohexene.

Yet another object of this invention is to provide a method for the preparation of caprolactam in high yields and in the absence of forming as by-product ammonium sulfate.

Other objects and advantages will become apparent from a reading of the following detailed description and example.

SUMMARY OF THE INVENTION

Broadly, this invention contemplates a method for preparing caprolactam which comprises:
(a) simultaneously contacting a solution containing cyclohexene, a denitrating agent and an aprotic organic solvent with dinitrogen tetroxide and oxygen, where the mole ratio of cyclohexene to denitrating agent is above about 0.5:1 to about 2:1, thereby forming 2-nitrocyclohexanone,
(b) contacting 2-nitrocyclohexaone with an alcohol in a non-aqueous environment at a temperature of from about 20 to 200° C. thereby forming an alkyl 6-nitrohexanoate, and
(c) contacting said alkyl 6-nitrohexanoate with hydrogen and a Group VIII metal catalyst at a temperature of from 20 to 300° C. and under a hydrogen pressure of 500 to 1500 p.s.i.g.

STAGE ONE

According to this invention cyclohexene is converted to caprolactam by initially forming a solution composed of cyclohexene, a denitrating agent and an organic solvent and contacting the solution with a mixture of dinitrogen tetroxide and oxygen at a temperature between about 0 to 40° C., preferably from 5 to 15° C. Temperatures in excess of 40° C. are undesirable because of the threat of explosion and temperatures below 0° C. require excessive refrigeration thereby rendering the process economically unattractive.

The ratio of the individual components in the first stage of the instant method represents an important aspect insofar as providing a process leading to high yields of caprolactam. Specifically, the mole ratio of cyclohexene to oxygen to dinitrogen tetroxide in the single step nitrooxidation eaction is maintained between about 1:1:0.5 and 1:30:1.5. It has been found that the presence of an aprotic organic solvent permits the mole ratio of denitrating agent to cyclohexene of about about 0.5:1 to about 2:1, preferably 0.8:1 to 1.3:1, during the nitrooxidation reaction to be maintained at levels heretofore considered inoperatively low. We have found that when conversion is conducted in the presence of the organic solvent, a significant economic benefit is realized in that lesser amounts of costly denitrating agent are needed, whereas in the absence of solvent amounts of denitrating agent several times that employed herein would be required to provide results comparable to that realized by the instant method. Ratios of denitrating agent below that specified above are undesirable because of the formation of by-products such as nitronitrates and nitroalcohols. The use of denitrating agent in amounts exceeding that specified results in excessive losses of agent, which losses may be reduced but not eliminated through the use of extensive separation and recovery procedures. The reaction time for this stage is generally between one half and five hours although longer and shorter periods may be employed depending upon the amount and rate of addition of dinitrogen tetroxide.

It will be appreciated that the nitrating agent, dinitrogen tetroxide, is an equilibrium mixture of dinitrogen tetroxide and nitrogen dioxide with equilibrium driven essentially to 100 percent dinitrogen tetroxide at 0° C. and essentially 100 percent nitrogen dioxide at 140° C. The term dinitrogen tetroxide as used herein denotes the equilibrium mixture as well as the pure $N_2O_4$ compound. Oxygen employed herein may be in pure form or diluted with air or in admixture with inert gases such as nitrogen or argon.

In the practice of this first stage, cyclohexene and denitrating agent are admixed with an aprotic organic solvent having a boiling point between about 30 to 100° C. Polar and protic solvents should be avoided in that their use results in the formation of mixtures composed of nitroketone, nitronitrate and nitroalcohol. The ratio of aprotic organic solvent to cyclohexene employed can range form 2:1 to 20:1 parts by weight. The product of the first stage reaction, namely 2-nitrocyclohexanone, can be recovered in admixture with the aprotic solvent if desired. Alternatively, by employing the specified solvent an additional benefit is imparted to the instant method in that the nitroketone may be recovered from the reaction mixture by means of distillation and extraction. Illustrative of the aprotic solvents which can be utilized in the first stage of this method we mention non-polar aprotic solvents such as n-hexane, n-heptane, carbon tetrachloride, cyclohexane, benzene and petroleum ether. In addition polar aprotic solvents such as diethylether, tetrahydrofuran and dioxane can be employed. Preferably we utilize non-polar aprotic solvents. Thereafter, dinitrogen tetroxide is introduced to the solution containing cyclohexene, denitrating agent and solvent at a rate of between about 0.001 and 0.1 gram per minute per gram of cyclohexene, along with oxygen introduced at the rate of about 1:1.5 to 10:1.5 grams per gram of dinitrogen tetroxide.

Among the denitrating agents contemplated in the instant invention are those selected from group consisting of

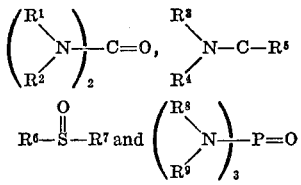

where $R^1$, $R^2$, $R^6$, $R^7$, $R^8$ and $R^9$ are alkyl from 1 to 5 carbons and $R^3$, $R^4$ and $R^5$ are hydrogen or alkyl from 1 to 5 carbons. Specific examples of the denitrating agent contemplated herein are dimethyl formamide, diethyl formamide, dimethyl acetamide, dimethyl sulfoxide, diethyl sulfoxide, tetramethylurea, tetraethylurea and hexamethylene phosphoramide. In addition, other denitrating agents such as 1-methyl-2-pyrrolidinone can be used. Particularly preferred denitrating agents are dimethyl formamide, diethyl sulfoxide and 1-methyl-2-pyrrolidinone.

STAGE TWO

In the second stage of the instant method, the 2-nitrocyclohexanone prepared above is contacted with an alcohol wherein the nitroketone is cleaved and esterified at temperatures of from 20 to 200° C. to an alkyl 6-nitrohexanoate. In practice, mole ratios of 2-nitrocyclohexanone to alcohol of from 1:1 to 1:100, preferably 1:5 to 1:25, are employed.

Alcohols employed in this stage of the method correspond to the formula ROH and include primary and secondary alcohols. Tertiary alcohols have not been found to be reactive. Thus, in the formula above R can be an alkyl group of from 1 to 20 carbon atoms such as methyl, ethyl, propyl, butyl, hexyl, octyl, decyl, dodecyl or hexadecyl. Dihydroxy and polyhydroxy primary and secondary alcohols are also intended to be understood as operative in the instant process. Illustrative of the alcohols contemplated herein we mention methanol, ethanol, isopropanol, n-butanol, 2-hexanol, cyclohexanol, 2-octanol, 2-decanol, 1-dodecanol, 1-hexadecanol, ethylene glycol, propylene glycol and pentaerythritol. Mixtures of alcohols such as $C_{10}$ to $C_{13}$ alcohols are contemplated including isomeric mixtures containing primary and secondary alcohols. In one embodiment, cleavage and esterification can be undertaken thermally, that is, in the absence of a catalytic agent, employing temperatures of from about 50 to 200° C., preferably from 100 to 190° C. In another embodiment, cleavage and esterification can be accomplished catalytically employing a basic catalyst at temperatures of from 20 to 120° C., preferably 60 to 100° C. In practice catalytic reactions below 20° C. are excessively slow. Conversely, thermal reactions exceeding 200° C. are deleterious in that thermal decomposition of the cyclic nitroketone to a mixture of products occurs rather than the desired cleavage and esterification. Pressures of from 0 to 500 p.s.i.g. may be employed. Specifically, thermal conversions are preferably conducted at pressures of 0 to 500 p.s.i.g. and the catalytic conversion conducted at pressures of 0 to 40 p.s.i.g.

Most importantly, this stage of the process must be conducted in a non-aqueous environment, that is, in the substantial absence of water. The cleavage and esterification reaction, whether conducted thermally or catalytically is sensitive to water and water in amounts exceeding 0.1 weight percent based on the weight of alcohol employed cause competing reactions to occur leading to the formation of acids instead of the desired ester. In a highly preferred aspect of this invention, absolute alcohols are used. Excessive amounts of alcohol can be employed serving as solvent for the reaction or alternatively an inert reaction solvent may be utilized such as n-hexene, n-heptane, xylene, ethylbenzene dichlorobenzene, methylnaphthalene, dioxane and tertiary alcohols. The reaction times for the second stage range from a few minutes to two hours.

With regard to the second stage embodiment involving catalytic cleavage and esterification, the basic catalysts contemplated herein are oxides, hydroxides and salts of the metals of Groups IA and IIA of the Periodic Table exemplified by sodium hydroxide, sodium carbonate, sodium fluoride, sodium acetate, sodium decanoate, potassium hydroxide, potassium carbonate, potassium fluoride, potassium acetate, potassium octanoate, calcium oxide, calcium carbonate, calcium fluoride, calcium propionate, barium oxide, barium carbonate, barium fluoride and barium hexanoate. Other basic catalysts include tertiary amines such as trimethylamine and triethylamine. Highly preferred catalysts are sodium carbonate, potassium carbonate and potassium fluoride. In accordance with this second stage embodiment, 2-nitrocyclohexanone and the alcohol are contacted with the catalyst in a weight ratio of catalyst to nitroketone between about 0.01:1 and 0.2:1, thereby forming an alkyl 6-nitrohexanoate. At the completion of this reaction, catalyst, when employed is separated as for example by filtration and excess alcohol and solvent, if present, are removed by distillation. The alkyl 6-nitrohexanoate product such as methyl 6-nitrohexanoate, ethyl 6-nitrohexanoate, cetyl 6-nitrohexanoate, etc., is substantially free of by-products

STAGE THREE

In the third stage of the method, the alkyl 6-nitrohexanoate is hydrogenated and cyclized to caprolactam by contacting with hydrogen and a Group VIII metal catalyst for a period of one-half to five hours at a temperature of from 20 to 300° C., preferably 100 to 220° C., under hydrogen pressures of from 500 to 1500 p.s.i.g. Illustrative of the Group VIII metal catalysts we mention the oxides, hydroxides and salts of the metals platinum, palladium, rhodium, ruthenium, iron, cobalt, nickel, iridium and osmium including mixtures thereof as for example platinum oxide, palladium chloride, Raney nickel, nickel on kieselguhr, platinum on carbon, ruthenium on carbon, rhodium on carbon, iron oxide and cobalt on silica. The metals may themselves also be employed including platinum, palladium, rhodium, ruthenium and nickel.

The preferred and convenient solvents for the hydrogenation are the alcohols used in Stage Two. This permits the reduction to occur in the solution from stage two without necessitating the separation of alcohol and, if employed, solvent thereby improving the efficiency of the process. Other solvents can be used in Stage Three and among those contemplated are pentane, heptane, Decalin, tetrahydrofuran, triethylamine and dimethylaniline. At the completion of the third stage, the product obtained comprises from 50 to 80 percent caprolactam and the remainder being essentially an alkyl 6-aminohexanoate. Caprolactam can be recovered from the product by distillation preferably under reduced pressures. Upon distillation of caprolactam from the reaction mixture, additional aminoester will cyclize to caprolactam. The distillation also yields as a co-product the alcohol ROH. The alcohol, used either as a reactant or solvent and reactant, can be recycled to Stage Two.

A particular advantage of stages two and three of the instant method resides in the ability to essentially convert all of the 2-nitrocyclohexanone to caprolactam and alkyl 6-aminohexanoate. In the instance where stages two and three are combined such that 2-nitrocyclohexanone is simultaneously contacted with the alcohol, hydrogen and a highly active Group VIII metal catalyst such as platinum oxide, Raney nickel or palladium metal, the reaction product contains substantial amounts of decahydrophenazine to the order of 40 percent. To the extent that competing reactions occur when stages two and three are combined forming such a dihydropyrazine, a corresponding amount of nitroketone can not be converted to caprolactam. Here, by employing stages two and three, the formation of measurable amounts of the dihydropyrazine is avoided inasmuch as hydrogen introduction is withheld until stage two is completed, namely the formation of the alkyl 6-nitrohexanoate. Dihydropyrazine formation can not now occur inasmuch as condensation can not proceed from the open chain nitroester.

In order to more fully illustrate the nature of this invention and the manner of practicing the same the following example is presented.

EXAMPLE

Into a 200 milliliter 3 neck flask equipped with a thermometer, condensor and gas inlet, there was charged 7.5 grams (0.09 mole) of cyclohexene, 7.0 milliliters (0.09 mole) of dimethyl formamide and 100 milliliters of carbon tetrachloride. To this solution maintained at temperature of 0 to 5° C. there was introduced oxygen at the rate of from 60 to 80 milliliters per minute and 8.28 grams (0.09 mole) of dinitrogen tetroxide at the rate of about 0.07 milliliters per minute over a period of two hours. At the end of the dinitrogen tetroxide-oxygen addition period the carbon tetrachloride solution was washed with three 50 milliliter portions of water to remove dimethyl formamide and nitric acid, dried and stripped of carbon tetrachloride by distillation under a pressure of 50 to 200 mm./Hg to yield 10.11 grams of a residue identified by infrared and nuclear magnetic resonance analyses to be 2-nitrocyclohexanone. No by-products were detected.

If all of the residue obtained in this stage is to be subsequently used in Stage Two, solvent stripping is unnecessary. Solvents of both Stages One and Two can be stripped at the termination of Stage Three to give the desired caprolactam.

STAGE TWO

To 4.6 grams (0.32 mole) of 2-nitrocyclohexanone there was added 200 milliliters (5 moles) of absolute methanol in a pressure reactor. 0.2 gram of platinum oxide catalyst was added at this point for convenience and does not take part in the reaction. The solution was heated to a temperature of 135 to 149° C. for 2 hours thereby forming methyl 6-nitrohexanoate.

STAGE THREE

Thereafter, the reactor was pressurized to 1000 p.s.i.g. with hydrogen whereupon a 5 to 10° C. exotherm was observed and reaction was kept at 149° C. for 2 hours and thereafter at a temperature of 190 to 204° C. for an additional 3 hours. The reaction mixture was filtered to remove the catalyst, methanol stripped therefrom by distillation and a residue weighing 3.87 grams was obtained and identified by infrared and nuclear magnetic resonance analyses to be caprolactam and methyl 6-aminohexanoate in the ratio of 7 to 3.

The residue was further heated to a temperature of 112 to 121° C. under 2 mm. pressure and caprolactam was distilled from the mixture. The aminoester, methyl 6-aminohexanoate, largely cyclizes to caprolactam and an 87 percent yield of caprolactam basis the dinitrogen tetroxide and cyclohexene charge was recovered.

We claim:

1. A method for preparing caprolactam which comprises:

(a) simultaneously contacting a solution containing cyclohexene, a denitrating agent and an aprotic organic solvent with dinitrogen tetroxide and oxygen, wherein said denitrating agent is selected from the group consisting of 2-pyrrolidinones, $$\left(\begin{array}{c}R^1\\ \diagdown\\ N\!\!-\!\!C\!\!=\!\!O\\ \diagup\\ R^2\end{array}\right)_{\!2}\!, \quad \begin{array}{c}R^3\\ \diagdown\\ N\!\!-\!\!\underset{\underset{\displaystyle R^4}{}}{\overset{\overset{\displaystyle O}{\|}}{C}}\!\!-\!\!R^5\end{array},$$

$$R^6\!\!-\!\!\underset{\underset{\displaystyle O}{\|}}{S}\!\!-\!\!R^7 \text{ and } \left(\begin{array}{c}R^8\\ \diagdown\\ N\!\!-\!\!\!\!\!\!\!\!\!-\!\!P\!\!=\!\!O\\ \diagup\\ R^9\end{array}\right)_{\!3}$$

where $R^1$, $R^2$, $R^6$, $R^7$, $R^8$ and $R^9$ are alkyl of from 1 to 5 carbons and $R^3$, $R^4$ and $R^5$ are hydrogen or alkyl of from 1 to 5 carbons, where the mole ratio of cyclohexene to dinitrating agent is above about 0.5:1 to about 2:1, wherein said contacting is conducted at a temperature between about 0 to 40° C., thereby forming 2-nitrocyclohexanone, (b) contacting 2-nitrocyclohexanone with an alcohol, wherein said alcohol is a primary or secondary alcohol corresponding to the formula ROH where R is an alkyl group of from 1 to 20 carbon atoms, in a non-aqueous environment at a temperature of about 20 to 200° C. thereby forming an alkyl 6-nitrohexanoate, and (c) contacting said alkyl 6-nitrohexanoate with hydrogen and a Group VIII metal catalyst at a temperature of from 20 to 300° C. under a hydrogen pressure of 500 to 1500 p.s.i.g.

2. A method according to claim 1 wherein said denitrating agent is dimethyl formamide.

3. A method according to claim 1 wherein said organic solvent has a boiling point of between about 30 to 100° C.

4. A method according to claim 1 wherein said contacting in (a) is conducted at a temperature between about 5 to 15° C.

5. A method according to claim 1 wherein the mole ratio of said denitrating agent to cyclohexene is about 0.8:1 to 1.3:1.

6. A method according to claim 1 wherein said organic solvent is carbon tetrachloride.

7. A method according to claim 1 wherein said organic solvent is benzene.

8. A method according to claim 1 wherein said alcohol in (b) is methanol.

9. A method according to claim 1 wherein step (b) is conducted thermally at a temperature of from 100 to 190° C.

10. A method according to claim 1 wherein step (b) is conducted in the presence of a basic catalyst at a temperature of from 60 to 100° C.

11. A method according to claim 10 wherein said catalyst is potassium fluoride.

12. A method according to claim 10 wherein said catalyst is sodium carbonate.

13. A method according to claim 1 wherein the mole ratio of 2-nitrocyclohexanone to alcohol in step (b) ranges from 1:1 to about 1:100.

14. A method according to claim 1 wherein said alkyl 6-nitrohexanoate in (b) is methyl 6-nitrohexanoate.

15. A method according to claim 1 wherein said Group VII metal catalyst is platinum oxide.

16. A method according to claim 1 wherein said Group VIII metal catalyst is nickel on kieselguhr.

17. A method according to claim 1 wherein said contacting in (c) is conducted at a temperature of 100 to 220° C.

References Cited

UNITED STATES PATENTS

| | | | |
|---|---|---|---|
| 2,071,252 | 2/1937 | Carothers | 260—239.3 A |
| 3,466,326 | 9/1969 | Lachowicz et al. | 260—586 R |
| 3,560,484 | 2/1971 | Tanaka et al. | 260—239.3 A |
| 3,574,756 | 4/1971 | Sheehan et al. | 260—239.3 A |
| 3,637,839 | 1/1972 | Tanaka et al. | 260—586 R |
| 3,658,810 | 4/1972 | Tanaka et al. | 260—239.3 A |

HENRY R. JILES, Primary Examiner

R. T. BOND, Assistant Examiner

U.S. Cl. X.R.

260—586 R, 478, 482 R, 326.5 FL, 326.5 FN, 553 R, 551 P, 561 R, 607 A, 267

FORM PO-1050 (5/69)

UNITED STATES PATENT OFFICE
CERTIFICATE OF CORRECTION

Patent No. 3,816,404                    Dated June 11, 1974

Inventor(s) Mahmoud S. Kablaoui, Richard F. Love and Roger G. Duranleau

It is certified that error appears in the above-identified patent and that said Letters Patent are hereby corrected as shown below:

Col. 2, line 13    "eaction" should read --reaction--

Col. 2, line 16    "about" first occurrence should read --above--

Col. 6, line 52    "VII" should read --VIII--

Signed and sealed this 29th day of October 1974.

(SEAL)
Attest:

McCOY M. GIBSON JR.                C. MARSHALL DANN
Attesting Officer                  Commissioner of Patents